I. S. & O. E. MERRELL.
PROCESS FOR OBTAINING THE SOLIDS FROM LIQUIDS.
APPLICATION FILED FEB. 16, 1912.
1,102,601.
Patented July 7, 1914.
2 SHEETS—SHEET 2.
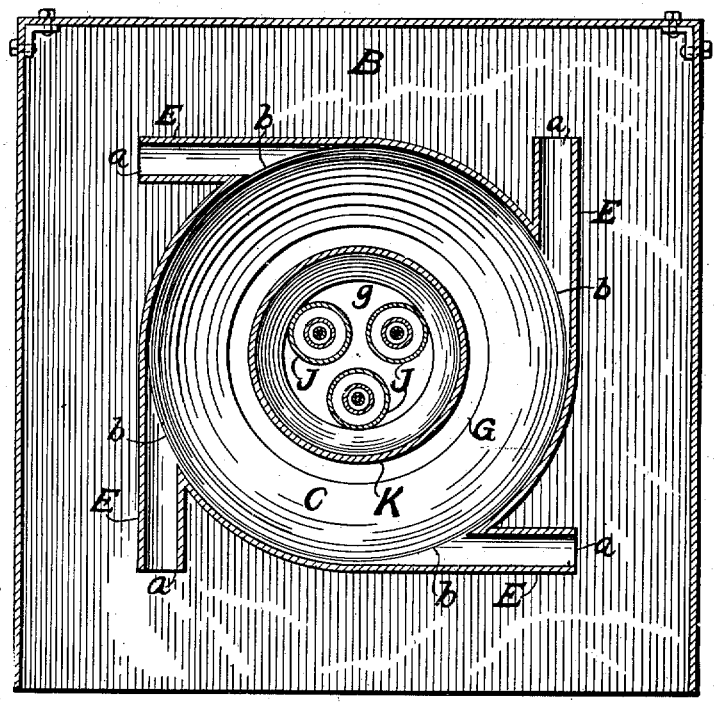
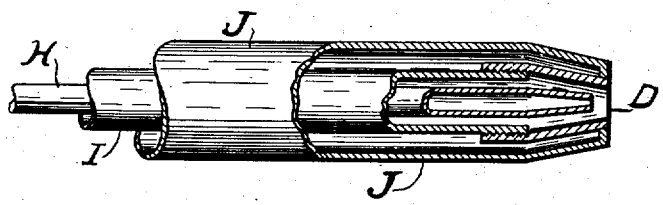
Witnesses:
Oliver E. Merrell
Irving S. Merrell Inventors
Eugene A. Thompson
By Howard P. Denison Attorney

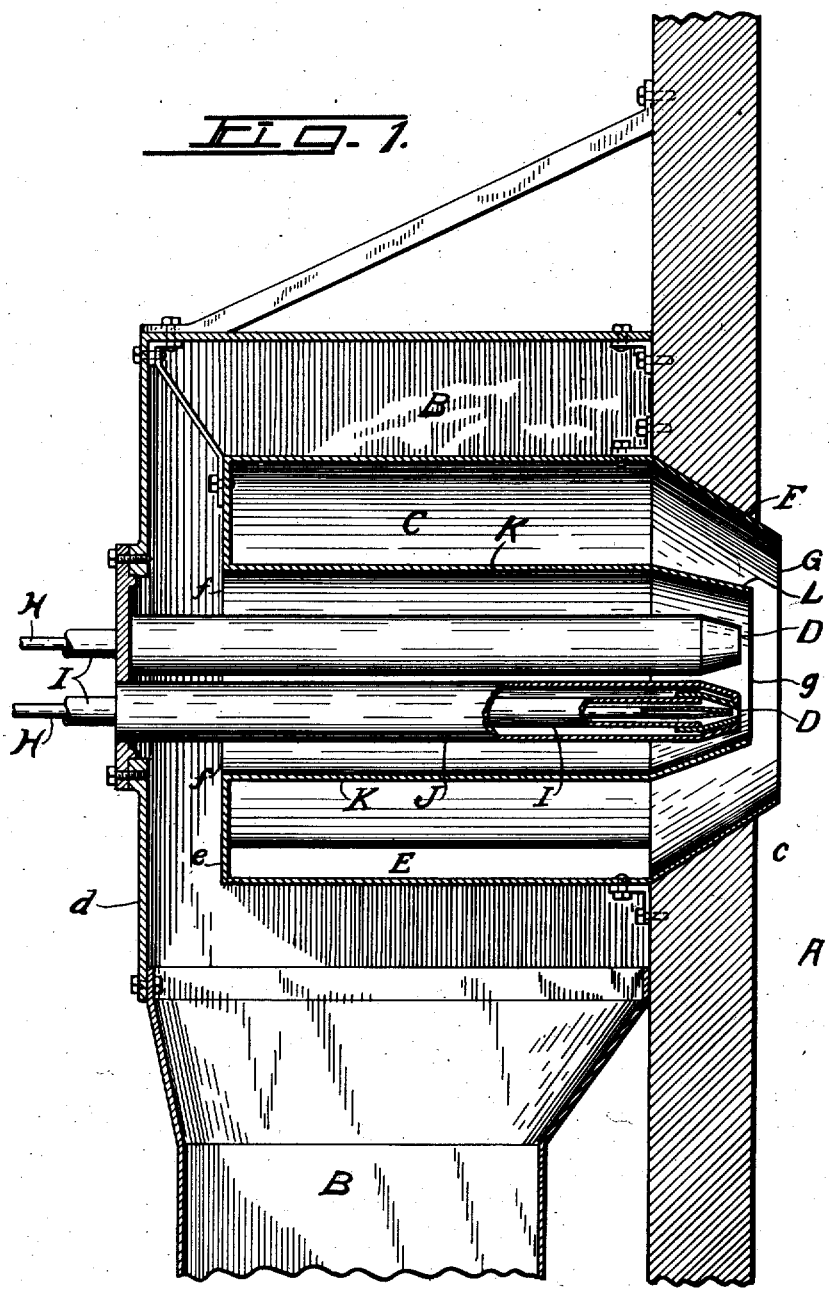

UNITED STATES PATENT OFFICE.

IRVING S. MERRELL AND OLIVER EDWARD MERRELL, OF SYRACUSE, NEW YORK, ASSIGNORS TO MERRELL-SOULE COMPANY, A CORPORATION OF NEW YORK.

PROCESS FOR OBTAINING THE SOLIDS FROM LIQUIDS.

1,102,601. Specification of Letters Patent. Patented July 7, 1914.

Original application filed April 4, 1910, Serial No. 553,444. Divided and this application filed February 16, 1912. Serial No. 678,117.

*To all whom it may concern:*

Be it known that we, IRVING S. MERRELL and OLIVER E. MERRELL, of Syracuse, in the county of Onondaga, in the State of New York, have invented new and useful Improvements in Processes for Obtaining the Solids from Liquids, of which the following, taken in connection with the accompanying drawings, is a full, clear, and exact description.

This invention relates to a process for obtaining the solids from organic liquids in the form of a substantially dry powder which may be returned again to its original liquid form by the addition of a suitable amount of water without any substantial impairment of the distinguishing characteristics of the original liquid, and is a division of application filed by us April 4th, 1910, No. 553,444.

The invention is especially applicable to and intended for the drying of organic liquids having a high moisture content, such as milk and eggs. If the milk is treated, it may be in its original condition, or the cream may be first removed; and, in either case, the milk (whole or skimmed) may be condensed or concentrated before subjecting it to the desiccating operation. Cream may also be dried to a powder by the new process.

The present process is an improvement upon the invention set forth in United States Letters Patent of Robert Stauf, No. 666,711, January 29, 1901.

The successful and commercial drying to a powder of such organic substances as milk and eggs having a high moisture content by the spraying process requires that there should be employed a large volume of air in proper moisture absorbing condition and that the drying should be wholly accomplished before the powder is separated from the air and collects upon the receiving or collecting surfaces. It is also desirable that the temperature of the current of drying air should be as low as consistent with proficiency to avoid any substantial alteration in the characteristics of the desiccated product. Also, it is important for commercial practice that the desiccating chamber should be small and that the rapidity of the operation should be great in order that a large amount of the organic liquid should be dried within a given length of time.

The present invention consists in a new and novel desiccating process, preferably carried out by the apparatus shown in the drawings, and in an economical and efficient manner for the production of a dried powder from organic substances, such as milk and eggs, in which the normal characteristics are substantially preserved.

Suitable apparatus for carrying out the new process is illustrated in the accompanying drawings wherein—

Figure 1 is a longitudinal sectional view of so much of the apparatus as is necessary for an understanding of the invention. Fig. 2 is a vertical cross section. Fig. 3 is a detail section of one of the liquid spray nozzles.

A is the desiccating chamber; B is a wind trunk through which heated air is forced into the desiccating chamber by a suitable air blower or pump; C is an air whirling chamber between the wind trunk and the desiccating chamber; and D, D are spray nozzles for the organic liquid, such as milk or eggs, which spray the liquid into the desiccating chamber within an envelop of the whirling air delivered by the air whirling chamber C.

The air whirling chamber is circular in cross section, and it receives heated air from the trunk B, through a plurality of tangential inlet channels E, E. These channels are shown as four in number equally spaced around the air whirling chamber, and of equal capacity. Each channel extends the length of the cylindrical part of the chamber C, and each has a mouth $a$, communicating with the interior of the trunk B, and a discharge port $b$, communicating with the interior of chamber C. The air is forced from the trunk through these tangential channels and is set into rapid whirling motion by the cylindrical walls of the air whirling chamber. The axis of chamber C, as shown, is horizontal and at right angles to one of the walls $c$, of the desiccating chamber A. The passage $f$ from the chamber C, to chamber A, is conical; so that the outlet opening G, of chamber C, is a circle of less diameter than that of chamber C. The plural equally spaced channels E insure a uniform distribution of the air; and the contracted outlet adds to its discharge velocity. The whirling air passes spirally through and out of chamber C, and issues into the desiccating chamber in the form of an expanding rotating and advancing volume of air of large capacity enveloping and surrounding the portion of the interior of the desiccating chamber into which the liquid is sprayed by nozzles D, D.

The spray nozzles may be either air spray nozzles, as shown, or may be hydraulic pressure spray nozzles like that set forth in application for Letters Patent of the United States Serial Number 316,115, filed May 10, 1906, of Paul Benevot and Edward De Neveu, which has matured into Patent No. 1,020,632, dated March 19, 1912. In case air spray nozzles are employed several are employed within the air whirling chamber, three being shown. In case hydraulic pressure spray nozzles are employed a single one may be employed in the illustrated installation owing to its greater capacity as compared with the air spray nozzles. Each air nozzle shown comprises an air outlet and a liquid outlet. The liquid outlet is at the end of a liquid supply pipe H, which extends beyond the rear wall *d* of the trunk B, to the liquid supply reservoir. The air outlet is at the end of an air pipe I, which surrounds the pipe H, and extends beyond the rear wall *d* of the trunk B, to any suitable source of compressed air, such as a blower or pump which forces the air through the pipe I, under sufficient pressure to convert the liquid issuing from the pipe H, into a fine spray. These pipes H, I, extend horizontally, and the group of them is centrally located within the chamber C. Each pipe I is located within and is sustained by an inclosing tube J, which is fastened to the rear wall *d*, of the trunk B. The rear wall *d*, of the trunk B, is back of the rear wall *e*, of the air whirling chamber C. The group of tubes J, is surrounded by a cylindrical drum K, centrally located within the air-whirling chamber and open at its rear (at *f*) to the trunk B. At its forward end it has an air discharge cone L, within the cone F, so that it has a contracted opening *g*, into the desiccating chamber A. The drum K, thus provides direct air passages surrounding the nozzle supporting tubes J, from trunk B, to the chamber A. The drum K, converts chamber C into an annular passage with concentric outer and inner walls, thus aiding materially in the production of the whirling current of air. The angle of cone F, is more acute than that of cone L, thus contracting the discharge opening G of chamber C, and thereby retarding the escape of the air.

In order that the process and apparatus may be fully understood, the details of one practical installation will be given.

A volumetric air blower capable of driving a large volume of air is employed having a blower discharge of one hundred and thirty three (133) square inches; and the blower speed is fourteen hundred (1400) revolutions a minute. This requires about four (4) horse power. The air pressure within the trunk B is three quarters (.75) ounces per square inch. Such a blower will deliver about twenty-five hundred (2500) cubic feet of air per minute to the desiccating chamber. The internal length from front to rear of the trunk B is twenty-four (24) inches and its width is thirty-two (32) inches. The internal diameter of chamber C is twenty (20) inches, and the length of the cylindrical part of said chamber is nineteen and one-half (19½) inches. The height of cone F, is five and three-fourths (5.75) inches; and the internal diameter of the opening G, is twelve and one-half (12½) inches. The internal diameter of the drum K, is ten (10) inches; the length of the inclined wall of cone L, is five and one-fourth (5.25) inches; and the internal diameter of the discharge opening of the drum is seven (7) inches. The width of each channel E, is two (2) inches. The desiccating chamber A, is eight and one-half (8½) feet high, eleven (11) feet long from the air-inlet G, to the opposite wall, and is eight (8) feet wide. The moisture laden air passes out through any suitable screened opening or foraminous dust collector, such as that of the Merrell, Gere and Merrell United States Letters Patent No. 860,929, July 23, 1907. The air is introduced within the trunk B, after being heated by passage over steam coils the heating being such that the average temperature within the chamber A, is one hundred and sixty-four (164) degrees Fahrenheit. The external diameter of each tube J, is two and five-eighths (2.625) inches. The internal diameter of the liquid outlet from the pipe H, is one-sixteenth (.0625) of an inch, and the internal diameter of the outlet from the air pipe I is one-eighth (.125) of an inch. The pressure of the air supplied to each pipe I is thirty (30) pounds per square inch. The relative location of the outlets from the drum and air whirling chamber with respect to the spray nozzle is properly shown in the drawings; the nozzles being within the drum outlet; and the drum outlet within the air whirling chamber outlet. The screened outlet from the desiccating chamber, the air blowers, and the heating coils are not shown since they may be same as in said Merrell, Gere and Merrell patent. These details are subject to variation depending upon practical conditions, such as the initial dryness of the air, the amount of moisture in the milk or other organic liquid, the quantity to be treated, and the pressure in the steam coils. The amount of air supplied must be regulated to correspond with its initial condition, the heating effect of the steam coils and the character and quantity of the liquid to be treated; expertness in which can be secured only through practical experience.

In operating the present improved process, the whirling air in large volume issues from the whirling chamber into the desiccating chamber. On entering the desiccating chamber the whirling air expands to cover a large volume of space and during its passage through the desiccating chamber toward the escape outlet, the whirling air maintains its rotation and advances spirally. The general effect is to thoroughly agitate and spread the rotating mass of air so that the incoming heated, rotated air occupies a large proportion of the space of the desiccating chamber. Into the middle of this rotating and agitated advancing mass of moisture absorbing air, the organic liquid is forced by the propelling action of the spraying devices aided by the direct current of surrounding moisture absorbing air issuing from the drum. The force of the spray added to the direct current of air through the drum prevents any portion of the liquid being carried back into the drum or into the air-whirling chamber due to back eddies created by the rotating air. The spray enters the desiccating chamber enveloped and surrounded by the whirling envelop of heated air and no particle of the spray can reach the walls of the desiccating chamber except by passing through this whirling envelop. In such passage each particle of spray must pass through an extended path, since as soon as a particle of spray strikes the whirling envelop it is carried around and is not permitted to drop directly by gravity on to the floor of the desiccating chamber. The whirling air is detained within the desiccating chamber by reason of its rotary motion, there being no direct passage of the rotating air from the air whirling chamber to the discharge outlet of the desiccating chamber. Hence, the spray is subjected to a long exposure to the heated whirling envelop of air into the middle of which the spray is driven, and there is a thorough dissipation of the spray so that every particle thereof is subjected to prolonged contact with moisture absorbing air. The result is that when the powder escapes from the air whirl and is eventually deposited upon the outlet screen or upon the walls of the desiccating chamber it is so completely dried that it contains no amount of moisture which is sufficient to cause any deterioration in the quality of the powder when kept for a prolonged period of time. Indeed, in the case of milk, it is practicable to so dry the milk powder that no moisture can be ascertained to be present beyond the water of crystallization of the milk sugar.

The new process consists in ejecting the organic liquid by means of a spray nozzle or nozzles into an enveloping whirling mass of moisture absorbing air during the passage of such air through a desiccating, separating and collecting chamber. The dry powder is collected within the desiccating chamber and on its outlet screen separated from the air current; while the air and vapor are discharged through the screened outlet separately from the dry powder.

The surrounding air drum K enveloping the spray nozzle or nozzles is important and useful in any situation where a whirl is imparted to the spray no matter how produced. The whirling action creates a vortex causing an inrush of air which results in the deposit of adhering particles of substance treated upon the spraying apparatus which gradually build up to a sufficient mass to clog each spray nozzle and stop its operation. This occurs in the absence of the drum K. With this drum present this difficulty is obviated since the direct current of enveloping air breaks the vacuum at the center of the vortex and entirely prevents the deposit of particles of the substance treated on the spraying apparatus.

We claim:

1. The process of desiccating liquids which consists in creating a whirling current of air within a desiccating chamber; forcibly injecting within such whirling air, in the same general longitudinal direction as the whirling body of air moves, the liquid in a finely divided condition.

2. The process of desiccating liquids which consists in creating a whirling current of air within a desiccating chamber; introducing within such whirling air, in the same general longitudinal direction as the whirling body of air moves, the liquid in a finely divided condition.

3. The process of desiccating liquids which consists in creating a whirling body of air within a desiccating chamber; injecting within such whirling air the liquid in a sprayed condition; and also blowing a direct current of air surrounding its spray into said whirling body of air.

4. The process of desiccating liquids which consists in introducing a body of air within a desiccating chamber; injecting within such body of air the liquid in a sprayed condition; imparting a whirling movement to said spray; and also blowing a direct current of air surrounding the spray into said body of air.

5. The process of desiccating liquids which consists in injecting into a desiccating chamber the liquid in a sprayed condition; imparting a whirling movement to said spray; and also blowing a direct current of air surrounding the spray into said body of air.

6. The process of desiccating liquids which consists in introducing a body of air within a desiccating chamber; injecting within such body of air the liquid in a sprayed condition; and also blowing a direct current of air surrounding the spray into said body of air.

7. The process of desiccating liquids which consists in injecting into a desiccating chamber the liquid in a finely divided condition; and in forcing a current of air surrounding and enveloping the finely divided liquid into said chamber.

In witness whereof we have hereunto set our hands this 14th day of February 1912.

IRVING S. MERRELL.
OLIVER EDWARD MERRELL.

Witnesses:
EUGENE A. THOMPSON,
H. E. CHASE.